US012580664B1

(12) United States Patent
Gidney

(10) Patent No.: US 12,580,664 B1
(45) Date of Patent: Mar. 17, 2026

(54) QUANTUM ENTANGLEMENT FOR DISTRIBUTED ACTIONS

(71) Applicant: Google LLC, Mountain View, CA (US)

(72) Inventor: Craig Gidney, Goleta, CA (US)

(73) Assignee: GOOGLE LLC, Mountain View, CA (US)

( * ) Notice: Subject to any disclaimer, the term of this patent is extended or adjusted under 35 U.S.C. 154(b) by 1131 days.

(21) Appl. No.: 17/372,605

(22) Filed: Jul. 12, 2021

Related U.S. Application Data

(60) Provisional application No. 63/051,023, filed on Jul. 13, 2020.

(51) Int. Cl.
*H04B 10/90* (2013.01)
*G06N 10/00* (2022.01)

(52) U.S. Cl.
CPC ............. *H04B 10/90* (2013.01); *G06N 10/00* (2019.01)

(58) Field of Classification Search
CPC ................................ G06N 10/00; H04B 10/90
See application file for complete search history.

(56) References Cited

U.S. PATENT DOCUMENTS

| | | |
|---|---|---|
| 11,030,546 B2 | 6/2021 | Gidney |
| 11,042,813 B2 | 6/2021 | Gidney |

| | | | |
|---|---|---|---|
| 11,676,104 B2 | 6/2023 | Szegedy et al. | |
| 2020/0374211 A1* | 11/2020 | Griffin | H04L 45/04 |
| 2021/0034411 A1* | 2/2021 | Griffin | G06N 5/025 |
| 2021/0175976 A1* | 6/2021 | Rahman | H04L 9/0855 |
| 2021/0176055 A1* | 6/2021 | Rahman | H04L 9/0855 |
| 2021/0390439 A1* | 12/2021 | Ramasamy | G06N 10/60 |
| 2022/0006534 A1* | 1/2022 | Reilly | H04B 10/90 |

OTHER PUBLICATIONS

Bennett, Charles H., et al. "Purification of noisy entanglement and faithful teleportation via noisy channels." Physical review letters 76.5 (1996): 722. (Year: 1996).*

(Continued)

*Primary Examiner* — Michelle T Bechtold
*Assistant Examiner* — Nicholas S Wu
(74) *Attorney, Agent, or Firm* — DORITY & MANNING P.A.

(57) ABSTRACT

Systems and methods for performing a distributed control action are disclosed. The systems and methods can include obtaining, by a quantum computing system including one or more qubits, a first entangled qubit of a pair of entangled qubits. A second entangled qubit of the pair of entangled qubits can be positioned at a second quantum computing system that is remote from the quantum computing system. The systems and methods can include identifying, by the quantum computing system, a coordinated event trigger. The coordinated event trigger can be indicative of an entanglement condition associated with a Bell inequality. The systems and methods can include, in response to identifying the coordinated event trigger, obtaining, by the quantum computing system, quantum measurements of the first entangled qubit. The systems and methods can include performing, by the quantum computing system, a distributed control action based at least in part on the quantum measurements.

20 Claims, 5 Drawing Sheets

300

(56)     References Cited

OTHER PUBLICATIONS

Mahajan, R. P. "A quantum neural network approach for portfolio selection." International Journal of Computer Applications 29.4 (2011): 47-54. (Year: 2011).*

Chakhmakhchyan, Levon, et al. "Compact entanglement distillery using realistic quantum memories." Physical Review A—Atomic, Molecular, and Optical Physics 88.4 (2013): 042312. (Year: 2013).*

Wikipedia, "Bell test experiments", 2016. (Year: 2016).*

Cacciapuoti, Angela Sara, et al. "Quantum internet: Networking challenges in distributed quantum computing." IEEE Network 34.1 (2019): 137-143. (Year: 2019).*

Pan, Jian-Wei, et al. "Entanglement purification for quantum communication." Nature 410.6832 (2001): 1067-1070. (Year: 2001).*

Wikipedia, "Entanglement Distillation", https://en.wikipedia.org/wiki/Entanglement_distillation, retrieved on Feb. 11, 2022, 9 pages.

Rozpedek et al., "Optimizing Practical Entanglement Distillation", arXIV:1803.10111v2, 36 pages.

* cited by examiner

400

430

410

420

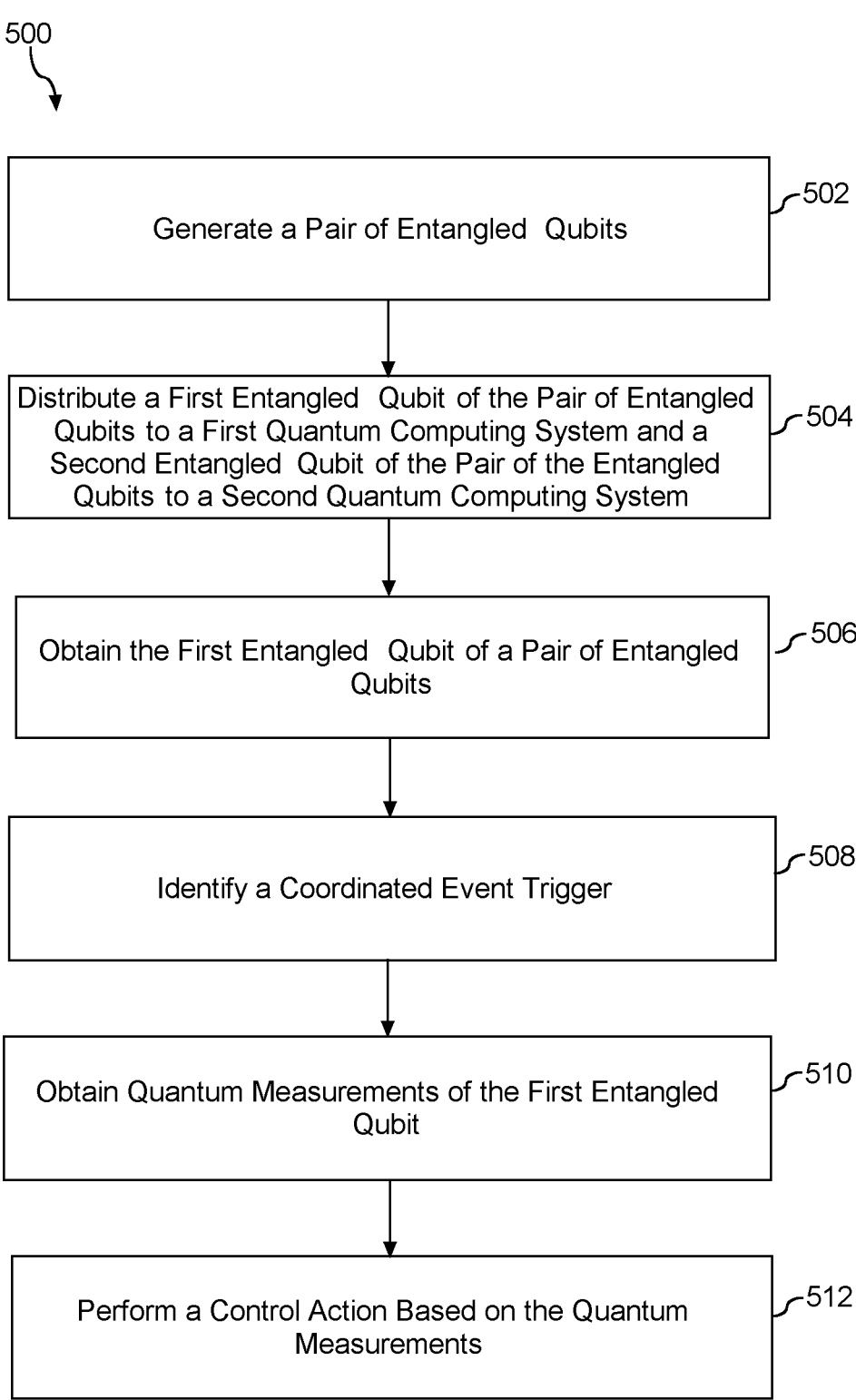

500

502 — Generate a Pair of Entangled Qubits

504 — Distribute a First Entangled Qubit of the Pair of Entangled Qubits to a First Quantum Computing System and a Second Entangled Qubit of the Pair of the Entangled Qubits to a Second Quantum Computing System 506 — Obtain the First Entangled Qubit of a Pair of Entangled Qubits 508 — Identify a Coordinated Event Trigger 510 — Obtain Quantum Measurements of the First Entangled Qubit 512 — Perform a Control Action Based on the Quantum Measurements

FIG. 5

QUANTUM ENTANGLEMENT FOR DISTRIBUTED ACTIONS

PRIORITY CLAIM

The present application claims the benefit of priority of U.S. Provisional Application Ser. No. 63/051,023, titled "Quantum Entanglement for Distributed Actions," filed on Jul. 13, 2020, which is incorporated herein by reference.

FIELD

The present disclosure relates generally to quantum computing, such as using quantum entanglement for distributed actions.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a method for performing a distributed control action. The method can include obtaining, by a quantum computing system including one or more qubits, a first entangled qubit of a pair of entangled qubits. A second entangled qubit of the pair of entangled qubits can be positioned at a second quantum computing system that is remote from the quantum computing system. The method can include identifying, by the quantum computing system, a coordinated event trigger. The coordinated event trigger can be indicative of an entanglement condition associated with a Bell inequality. The method can include, in response to identifying the coordinated event trigger, obtaining, by the quantum computing system, quantum measurements of the first entangled qubit. The method can include performing, by the quantum computing system, a distributed control action based at least in part on the quantum measurements.

Another example aspect of the present disclosure is directed to a quantum computing system configured for distributed computation. The quantum computing system can include quantum hardware comprising one or more qubits and one or more memory devices storing instructions, that, when implemented, instruct the quantum computing system to perform operations. The operations can include obtaining, by the quantum hardware, a first entangled qubit of a pair of entangled qubits. A second entangled qubit of the pair of entangled qubits can be positioned at a second quantum computing system that is remote from the quantum computing system. The operations can include identifying, by the quantum computing system, a coordinated event trigger. The coordinated event trigger can be indicative of an entanglement condition associated with a Bell inequality. The operations can include, in response to identifying the coordinated event trigger, obtaining, by the quantum hardware, quantum measurements of the pair of entangled qubits. The operations can include performing, by the quantum computing system, a distributed control action based at least in part on the quantum measurements.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 depicts a flowchart diagram of an example method for performing distributed quantum computing using a distributed quantum computing system according to example embodiments of the present disclosure.

Figure 1:
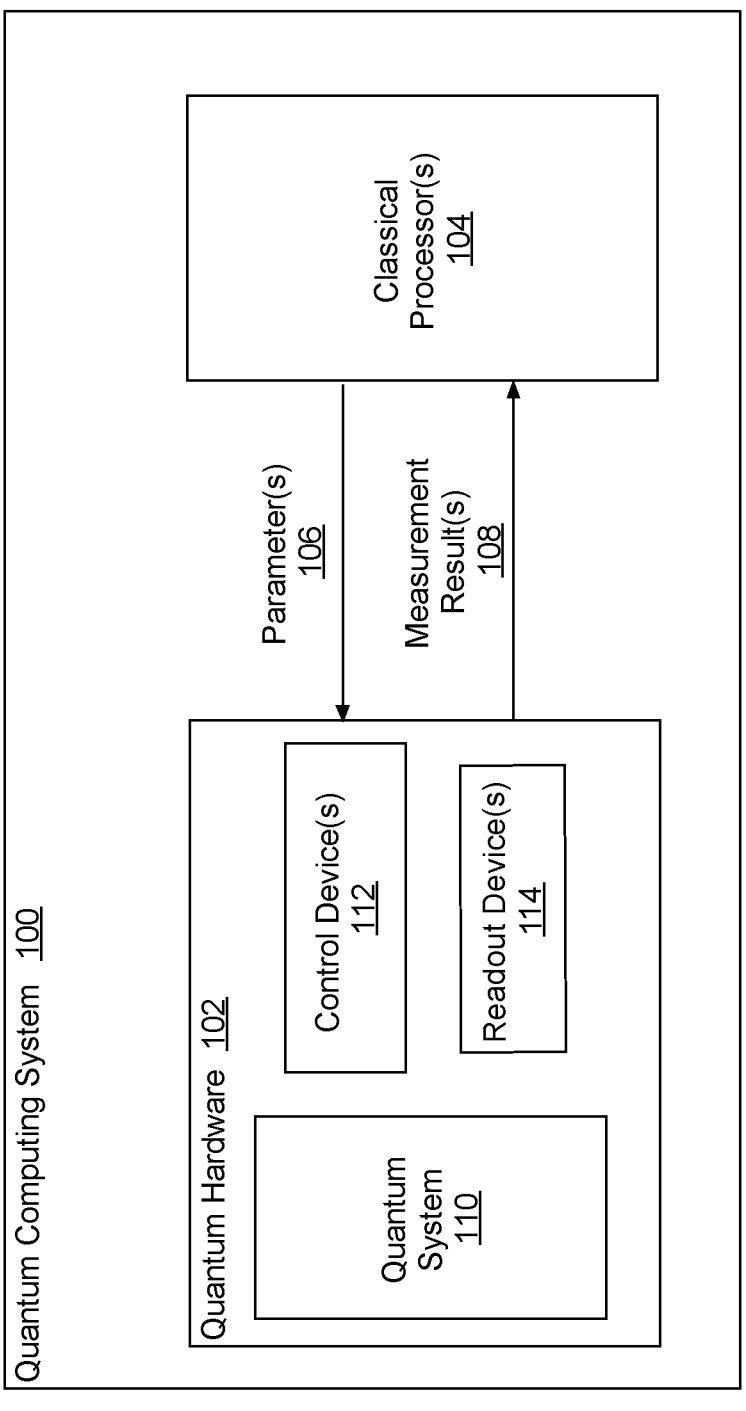
FIG. 1 depicts an example quantum computing system according to example embodiments of the present disclosure.

Reference numerals that are repeated across plural figures are intended to identify the same features in various embodiments.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Distributed computing refers to the use of a plurality of separate computing systems to perform actions simultaneously and/or near-simultaneously at the computing systems. The computing systems can be positioned at several different locations around the world. The computing systems can coordinate in order to improve their effectiveness at synchronous actions. Furthermore, the computing systems can frequently have distances as high as thousands of miles separating the computing systems. Communication delays associated with transmitting classical data (e.g., bit messages) across these distances can be especially significant due to the rapid nature at which some events occur and/or extreme time-sensitivity (e.g., on the order of milliseconds or less) of some events. Thus, communication delays associated with data transmission can limit overall effectiveness of the distributed computing systems.

Some distributed events can be modeled by and/or otherwise be represented by distributed coordination tasks, such as coordination games experiencing Bell inequalities (e.g., Bell tasks). Bell inequalities can be present in coordinated tasks defining interactions between systems that are not in communication but can experience interconnectedness in outcome. For instance, Bell tasks can be useful in separate coordinated systems that are infeasible to connect using conventional communication techniques, such as systems that operate with limiting time constraints and/or are separated by too great of distances to be connected according to conventional physics, even by information moving at the speed of light, in time frames allowed by the coordinated tasks.

For instance, Bell inequalities define systems that can be connected by quantum entanglement. According to example aspects of the present disclosure, a distributed quantum computing system can utilize quantum entanglement to perform and/or assist in performing distributed control actions. The use of quantum entanglement can allow the distributed quantum computing system to better perform high frequency coordinated tasks faster than can be possible and/or feasible by classical systems in cases defined by distributed coordination games and/or other coordinated tasks having Bell inequalities. This can improve performance of high frequency coordination and enable faster response times in high frequency distributed computing systems. For instance, quantum entanglement can be useful in the absence of and/or alternatively to classical (e.g., binary) communications.

According to example aspects of the present disclosure, a distributed quantum computing system can utilize quantum entanglement to perform high frequency distributed control actions at a plurality of locations. The distributed quantum computing system can include an entangled qubit generator that is configured to generate at least a pair of entangled qubits. The distributed quantum computing system can further include a first quantum computing system and a second quantum computing system that is remote from the first quantum computing system. For instance, the second quantum computing system can be positioned at a different position from the first quantum computing system, such as in a different city, county, province, state, country, hemisphere, etc. The entangled qubit generator can be included in one of the first or second quantum computing systems, or an additional, remote computing system that is remote from both the first quantum computing system and the second quantum computing system.

The entangled qubit generator can generate at least a pair of entangled qubits. One of each of the pair of entangled qubits (e.g., halves of pairs of entangled qubits) can be distributed to each of the first and second quantum computing systems. For instance, a first entangled qubit of the pair of entangled qubits can be distributed to the first quantum computing system and a second entangled qubit of the pair of entangled qubits can be distributed to a second quantum computing system. As one example, the pair of entangled qubits can be generated at the first quantum computing system and distributed to the second quantum computing system. As another example, the pair of entangled qubits can be generated at the second quantum computing system and distributed to the first quantum computing system. For instance, a first qubit of the pair of qubits can be retained at the generating computing system (e.g., in a delay line) and a second qubit of the pair can be transmitted to the other computing system. As another example, the pair of entangled qubits can be generated at remote quantum hardware, such as a remote quantum computing system, and distributed to the first quantum computing system and the second quantum computing system. For instance, each of the quantum computing systems can include one of the pair of qubits after distribution. In some embodiments, the quantum computing systems can include different pools of qubits for different games. The pair of qubits can be labeled, queued, etc. to facilitate distribution and/or measurement.

The pair of qubits can be distributed in any suitable manner in accordance with example aspects of the present disclosure. As one example, in some embodiments, distributing the first entangled qubit of the pair of entangled qubits to the first quantum computing system and the second entangled qubit of the pair of entangled qubits to the second computing system can include transmitting at least one of the first entangled qubit or the second entangled qubit through a satellite communication system. For instance, the pair of qubits can be generated at one of the first or second quantum computing systems (and/or a remote quantum computing system) and transmitted to the other(s) by satellite communications. In some embodiments, the satellite communication system can be and/or can include a low-earth-orbit satellite.

As another example, in some embodiments, distributing the first entangled qubit of the pair of entangled qubits to the first quantum computing system and the second entangled qubit of the pair of entangled qubits to the second computing system can include transporting a quantum memory device storing at least one of the first entangled qubit or the second entangled qubit from a first location to a second location. For instance, the quantum memory device (e.g., a delay line) including one of the pair of qubits can be transported by a vehicle, such as an aerial vehicle, train, truck, boat, etc., from a first location to a second location. The second location can be distinct from the first location. In some embodiments, a distance between the first location and the second location can be greater than about 1000 kilometers.

In some embodiments, quantum entanglement swapping can be useful in distributing the qubits. For instance, for a system having three qubits A, B, and C, where qubit A and qubit B are entangled and qubit B and qubit C are entangled, the entanglement between qubits A and B and qubits B and C can be consumed to produce entanglement between qubits A and C.

In some embodiments, after distributing the qubits, it can be beneficial to distill at least one of the pair of entangled qubits into a distillation comprising a high quality entanglement. For instance, high quality entanglement can provide improved performance (e.g., improved correlation) of quantum computing operations, such as obtaining quantum measurements (e.g., as opposed to noisy entanglement). For instance, noise can be introduced into the pair of entangled qubits during distribution, which can degrade quality of the entanglement. In some cases, quantum entanglement distillation can require complex quantum processing.

In some embodiments, distilling at least one of the pair of entangled qubits into a distillation can include distilling one or more copies of the pair of entangled qubits into one or more approximately pure Bell pairs. As one example, entanglement distillation can be the transformation of N copies of an arbitrary entangled state p into some number of approximately pure Bell pairs. For instance, the entanglement distillation can be performed using only local operations and/or classical communication. Quantum entanglement distillation can mitigate the degenerative influence of noisy quantum channels by transforming previously shared less entangled pairs into a smaller number of maximally and/or nearly maximally entangled pairs.

Additionally, distilling the pair of entangled qubits can include storing, in a memory device, one or more distillation qubits representative of the distillation. For example, the distillation qubits can be associated with a high quality distillation. For example, storing the distilled pair of qubits can include storing the one or more distillation qubits (e.g., in place of and/or additionally to the pair of entangled qubits).

The quantum computing system(s) (e.g., the first quantum computing system and/or the second quantum computing system) can identify a coordinated event trigger indicative of an entanglement condition. For example, the coordinated event trigger can be indicative that it would be beneficial to perform a distributed control action (e.g., buy or sell financial assets, such as stocks, bonds, etc.). For instance, the quantum computing system(s) can identify (e.g., as a coordinated event trigger) presence of an esoteric game having strict timing constraints that can be indicative of a quantum-advantageous game, such as a CHSH game, Bell game, etc. The games may have time durations of about 10 s of milliseconds, such as less than about 100 milliseconds. For instance, the coordinated event trigger can be identified from exchange data, such as historical and/or current stock data, bond data, currency data, and/or other suitable financial data, and/or any other suitable type of data.

It can be desirable to respond to these quantum-advantageous games in a quick and/or discreet manner. The coordinated event trigger may be present for both quantum computing systems. As one example, a coordinated event trigger can include an event in data, such as a trade. The use of quantum computing, such as quantum entanglement, can be beneficial in responding to the coordinated event trigger, such as providing for quick measurements and/or decision making.

In response to identifying a coordinated event trigger, the first quantum computing system and/or the second quantum computing system can obtain quantum measurements of the pair of entangled qubits. For example, a quantum measurement process can be performed on the pair of entangled qubits at each of the first and/or second quantum computing systems to resolve the pair of entangled qubits to a basis state. In some cases, the quantum measurement process can be performed quickly (e.g., in under a millisecond) such that a timely response to the coordinated event trigger can be determined based on the quantum measurements.

Based on the quantum measurements, the first quantum computing system and/or the second quantum computing system can perform a distributed control action. For instance, the first quantum computing system and second quantum computing system can each perform a coordinated distributed control action. Coordinated distributed control actions can be performed quicker according to example aspects of the present disclosure compared to conventional systems. For instance, tandem distributed control actions can be performed faster using quantum computing systems according to example aspects of the present disclosure than in systems that rely on conventional algorithms, plans, communication, etc. The quantum measurements can be used to improve performance at a "game" (e.g., Bell game) present in an entanglement condition.

The distributed control action can be and/or can include any suitable action that may be performed at a plurality of computing systems and/or any other necessary and/or supplementary computation actions associated therewith. For example, the distributed control action can include buying and/or selling assets, measuring data, sending communications, etc. As one example, the distributed control action can include communicating a computer-implemented control action that, when implemented, instructs classical hardware to perform an asset transaction, such as, for example, buying and/or selling assets.

After the quantum measurements are obtained, the pair of qubits can be resolved (e.g., no longer be in a superimposed state). Thus, to perform further distributed control actions and/or other computations, it may be desirable for the quantum computing systems to obtain new pair(s) of qubits. For instance, new pairs of entangled qubits can be provided intermittently, in response to a quantum measurement, regularly (e.g., after a certain time duration), continuously, as available, and/or according to any other suitable timing.

Although example aspects of the present disclosure are discussed with reference to a first quantum computing system and a second quantum computing system, in addition to "pairs" of entangled qubits, it should be understood that any suitable number of entangled quantum computing systems and/or qubits can be employed in accordance with the present disclosure. For instance, sets of three or more entangled qubits can be distributed (e.g., continuously distributed) among three or more quantum computing systems at different locations.

Aspects of the present disclosure can achieve a number of technical effects and benefits, including, for example, improvements to computing technologies, such as quantum computing technologies. As one example, aspects of the present disclosure can provide for improved response time to coordinated events, including coordinated events that occur at distributed locations too far for conventional communication techniques (e.g., fiber optic cables, etc.) to be useful. As one example, aspects of the present disclosure can be used in to provide improved communications (e.g., in lieu of classical communication) in exchanges that are distributed across different countries, etc. By reducing communication time, computing systems can devote additional time and resources to other functions of the computing system.

Referring now to the FIGS., example embodiments of the present disclosure will be discussed in further detail. As used herein, "about" in conjunction with a stated numerical value is intended to refer to within 20% of the stated numerical value.

FIG. 1 depicts an example quantum computing system 100. The computing system 100 can be or can include, for instance, some or all of the first quantum computing system, the second quantum computing system, and/or a remote quantum computing system as discussed herein. The example system 100 is an example of a system on one or more classical computers or quantum computing devices in one or more locations, in which the systems, components, and techniques described below can be implemented. Those of ordinary skill in the art, using the disclosures provided herein, will understand that other quantum computing structures or systems can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some embodiments, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum logic gates or circuits of quantum logic gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some embodiments, the multi-level quantum subsystems may be superconducting qubits and the control devices 112 may be configured to provide control pulses to control lines to generate magnetic fields to adjust a frequency of the qubits.

The quantum hardware 102 may further include readout devices 114 (e.g., readout resonators). Measurement results 108 obtained via measurement devices may be provided to the classical processors 104 for processing and analyzing. In some embodiments, the quantum hardware 102 may include a quantum circuit and the control device(s) 112 and readout devices(s) 114 may implement one or more quantum logic gates that operate on the quantum system 102 through physical control parameters (e.g., microwave pulse) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some embodiments, a Purcell filter can be used in conjunction with the readout device(s) 114 to impede microwave propagation at the qubit frequency.

Figure 2:
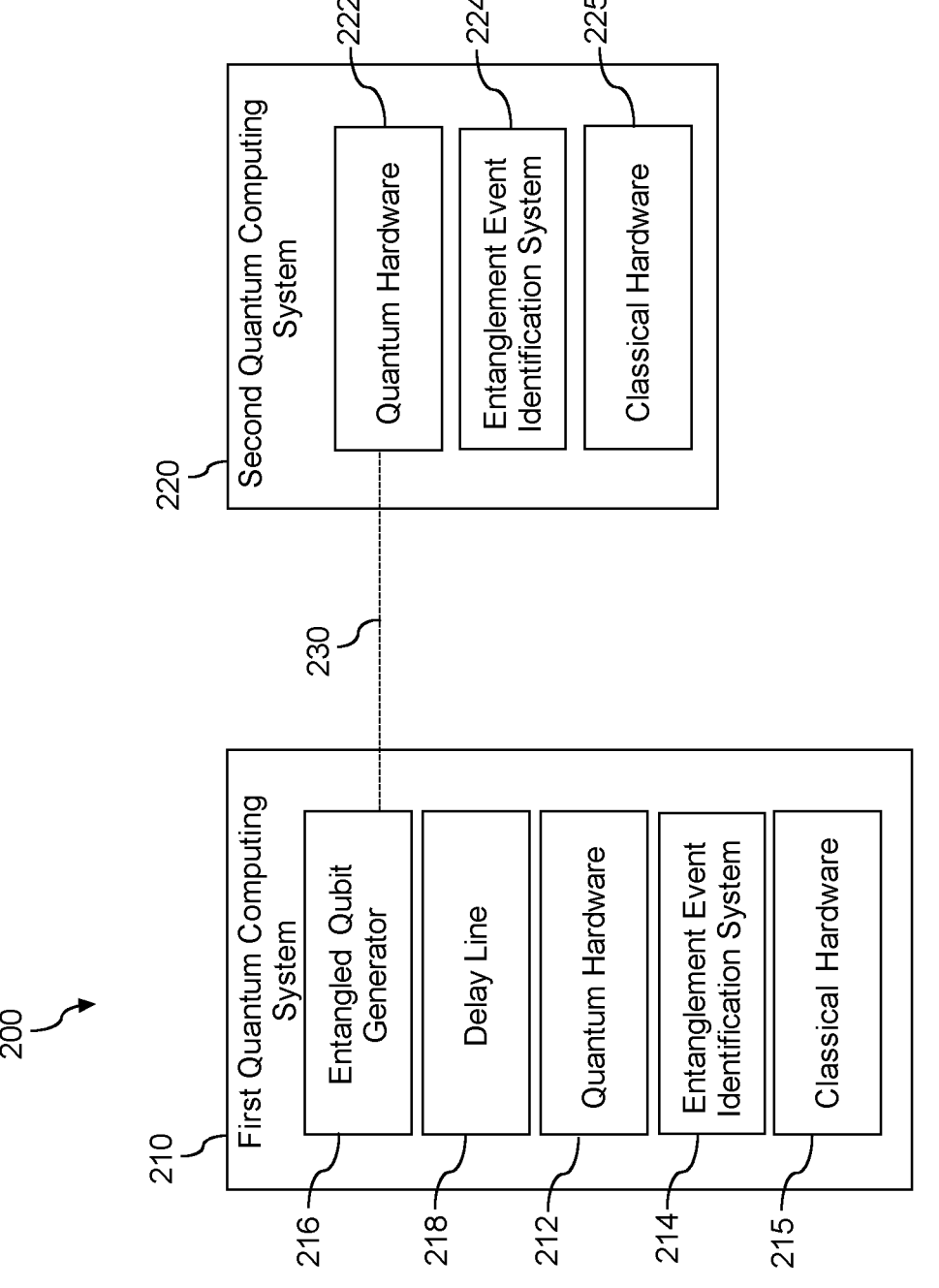
FIG. 2 depicts an example distributed quantum computing system according to example embodiments of the present disclosure.
Figure 3:
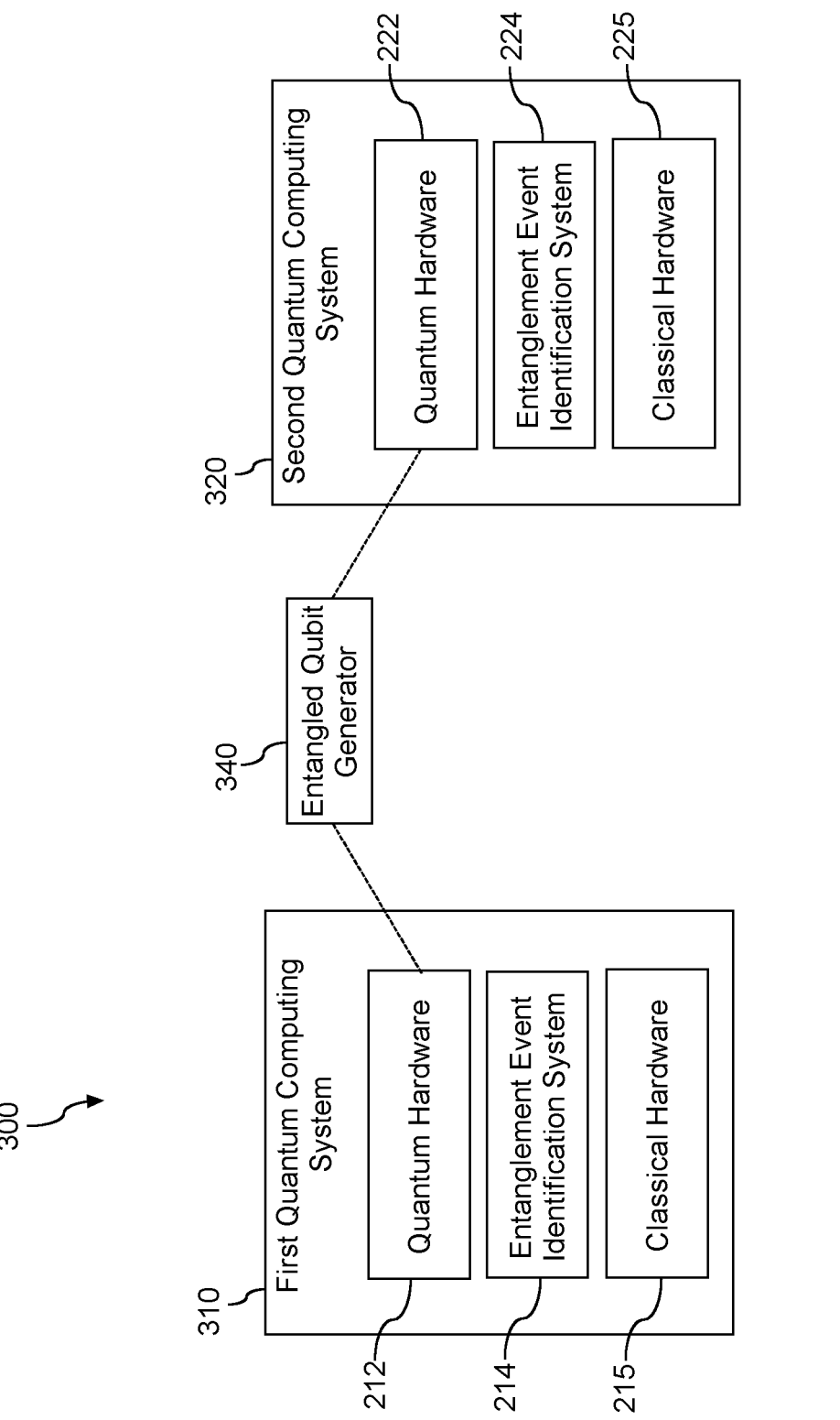
FIG. 3 depicts an example distributed quantum computing system according to example embodiments of the present disclosure.

FIG. 2 depicts an example distributed quantum computing system 200 according to example embodiments of the present disclosure. According to example aspects of the present disclosure, distributed quantum computing system 200 can utilize quantum entanglement to perform distributed quantum computation at a plurality of locations. The distributed quantum computing system can further include a quantum computing system 210 and a second quantum computing system 220 that is remote from the first quantum computing system 210. For instance, the second quantum computing system 220 can be positioned at a different exchange (e.g., stock exchange) from the first quantum computing system 210, such as in a different city, county, province, state, country, hemisphere, etc. The distributed quantum computing system 200 can include entangled qubit generator 216 that is configured to generate at least a pair of entangled qubits. As illustrated in FIG. 2, the entangled qubit generator 216 can be included in the first quantum computing system 210. Additionally and/or alternatively, entangled qubit generator 216 (and/or delay line 218) can be positioned in the second quantum computing system 220 and/or an additional, remote computing system that is remote from both the first quantum computing system 210 and the second quantum computing system 220, in accordance with example aspects of the present disclosure (e.g., as illustrated in FIG. 3).

The entangled qubit generator 216 can generate at least a pair of entangled qubits. One of each of the pair of entangled qubits (e.g., halves of pairs of entangled qubits) can be distributed to each of the first and second quantum computing systems 210, 220. For instance, a first entangled qubit of the pair of entangled qubits can be distributed to the first quantum computing system 210 and a second entangled qubit of the pair of entangled qubits can be distributed to a second quantum computing system 220. As one example, the pair of entangled qubits can be generated at the first quantum computing system 210 (e.g., by entangled qubit generator 216) and distributed to the second quantum computing system 220 by coupling 230. For instance, a first qubit of the pair of qubits can be retained at the first computing system 210 (e.g., in delay line 218) and a second qubit of the pair can be transmitted to the second computing system 220. For instance, each of the quantum computing systems 210, 220 can include one of the pair of qubits after distribution. In some embodiments, the quantum computing systems 210, 220 can include different pools (e.g., in delay lines, such as delay line 218) of qubits for different games. The pair of qubits can be labeled, queued, etc. to facilitate distribution and/or measurement. Coupling 230 can be any suitable coupling, such as a satellite communication system.

The first quantum computing system 210 and/or the second quantum computing system 220 can identify a coordinated event trigger indicative of an entanglement condition. For instance, first quantum computing system 210 can include entanglement event identification system 214. Similarly, second quantum computing system 220 can include entanglement event identification system 224. Entanglement event identification systems 214, 224 can be configured to identify coordinated event triggers in accordance with example aspects of the present disclosure. For example, entanglement event identification systems can analyze measurements from the pair of entangled qubits (e.g., during distillation) to identify the presence of an entanglement condition (e.g., a Bell task). In some embodiments, the entanglement event identification systems 214, 224 can be coupled to and/or otherwise included in classical hardware 215, 225, respectively.

The coordinated event trigger can be indicative that it would be beneficial to perform a distributed control action (e.g., buy or sell financial assets, such as stocks, bonds, etc.). For instance, the quantum computing system(s) 210, 220 can identify (e.g., as a coordinated event trigger) presence of an esoteric game having strict timing constraints that can be indicative of a quantum-advantageous game, such as a CHSH game, Bell games, etc. The games may have time durations of about 10 s of milliseconds, such as less than about 100 milliseconds. For instance, the coordinated event trigger can be identified from exchange data, such as historical and/or current stock data, bond data, currency data, and/or other suitable financial data, and/or any other suitable type of data.

It can be desirable to respond to these quantum-advantageous games in a quick and/or discreet manner. The coordinated event trigger may be present for both quantum computing systems 210, 220. As one example, a coordinated event trigger can include an event in data, such as a trade. The use of quantum computing, such as quantum entanglement, can be beneficial in responding to the coordinated event trigger, such as providing for quick measurements and/or decision making.

The first quantum computing system 210 can include quantum hardware 212. Similarly, the second quantum computing system 220 can include quantum hardware 222. Quantum hardware 212, 222 can be or can include, for example, some or all of quantum computing system 100 (e.g., quantum hardware 102) discussed with reference to FIG. 1. Quantum hardware 212, 222 can receive the pair of entangled qubits (e.g., from entangled qubit generator 216 and/or delay line 218) and perform quantum computations using at least the pair of entangled qubits. For instance, in response to identifying a coordinated event trigger, the first quantum computing system 210 and/or the second quantum computing system 220 can obtain quantum measurements of the pair of entangled qubits. For example, a quantum measurement process can be performed by quantum hardware 212, 222 on the pair of entangled qubits at each of the first and/or second quantum computing systems 210, 220 to resolve the pair of entangled qubits to a basis state. In some cases, the quantum measurement process can be performed quickly (e.g., in under a millisecond) such that a timely response to the coordinated event trigger can be determined based on the quantum measurements.

Based on the quantum measurements, the first quantum computing system 210 and/or the second quantum computing system 220 can perform a distributed control action. For instance, the first quantum computing system 210 and second quantum computing system 220 can each perform a coordinated distributed control action. Coordinated distributed control actions can be performed quicker according to example aspects of the present disclosure compared to conventional systems. For instance, tandem distributed control actions can be performed faster using quantum computing systems 210, 220 according to example aspects of the present disclosure than in systems that rely on conventional algorithms, plans, communication, etc. The quantum measurements can be used to improve performance at a "game" (e.g., Bell game) present in an entanglement condition.

As one example, the first quantum computing system 210 can be or can include classical hardware 215. Similarly, the second quantum computing system 220 can be or can include classical hardware 225. The classical hardware 215, 225 can be configured to perform actions (e.g., distributed control actions) based on the quantum measurements. For instance, the quantum measurements can be obtained by quantum hardware 212, 222 and transmitted to classical hardware 215, 225 for use in deciding on a distributed control action to be performed.

The distributed control action can be and/or can include any suitable action that may be performed at a plurality of computing system and/or any other necessary and/or supplementary computation actions associated therewith. For example, the distributed control action can include buying and/or selling assets, measuring data, sending communications, etc. As one example, the distributed control action can include communicating a computer-implemented control action that, when implemented, instructs classical hardware to perform an asset transaction, such as, for example, buying and/or selling assets.

After the quantum measurements are obtained, the pair of qubits can be resolved (e.g., no longer be in a superimposed state). Thus, to perform further distributed control actions and/or other computations, it may be desirable for the quantum computing systems 210, 220 to obtain new pair(s) of qubits. For instance, new pairs of entangled qubits can be provided intermittently, in response to a quantum measurement, regularly (e.g., after a certain time duration), continuously, as available, and/or according to any other suitable timing.

FIG. 3 depicts an example distributed quantum computing system 300 according to example embodiments of the present disclosure. Distributed quantum computing system 300 can include components discussed with reference to distributed computing system 200 of FIG. 2.

Distributed quantum computing system 300 can include first quantum computing system 310 and second quantum computing system 320. Quantum computing systems 310, 310 can function similarly to quantum computing systems 210, 220 of FIG. 2. However, as illustrated in FIG. 3, quantum computing systems 310, 320 can receive a pair of entangled qubits from external entangled qubit generator 340. For instance, entangled qubit generator 340 can be at least a portion of a remote quantum computing system that is remote from quantum computing systems 310, 320. Entangled qubit generator 340 can generate and/or distribute one or more pairs of entangled qubits and transmit the entangled qubits to quantum computing systems 310, 320.

The pair of qubits can be distributed in any suitable manner in accordance with example aspects of the present disclosure. As one example, in some embodiments, distributing the first entangled qubit of the pair of entangled qubits to the first quantum computing system 310 and the second entangled qubit of the pair of entangled qubits to the second computing system 320 can include transmitting at least one of the first entangled qubit or the second entangled qubit through a satellite communication system. For instance, the pair of qubits can be generated at entangled qubit generator

340 and transmitted to the quantum computing systems 310, 320 by satellite communications. In some embodiments, the satellite communication system can be and/or can include a low-earth-orbit satellite.

As another example, in some embodiments, distributing the first entangled qubit of the pair of entangled qubits to the first quantum computing system 310 and the second entangled qubit of the pair of entangled qubits to the second computing system 320 can include transporting a quantum memory device storing at least one of the first entangled qubit or the second entangled qubit from a first location to a second location. For instance, a quantum memory device (e.g., a delay line) including one of the pair of qubits can be transported by a vehicle, such as a freight train, truck, boat, etc., from a first location to a second location. The second location can be distinct from the first location. In some embodiments, a distance between the first location and the second location can be greater than about 1000 kilometers.

In some embodiments, quantum entanglement swapping can be useful in distributing the qubits. For instance, for a system having three qubits A, B, and C, where qubit A and qubit B are entangled and qubit B and qubit C are entangled, the entanglement between qubits A and B and qubits B and C can be consumed to produce entanglement between qubits A and C.

In some embodiments, after distributing the qubits, it can be beneficial to distill at least one of the pair of entangled qubits into a distillation comprising a high quality entanglement. For instance, high quality entanglement can provide improved performance (e.g., improved speed) of quantum computing operations, such as obtaining quantum measurements (e.g., as opposed to noisy entanglement). For instance, noise can be introduced into the pair of entangled qubits during distribution, which can degrade quality of the entanglement. In some cases, quantum entanglement distillation can require complex quantum processing. Thus, a fault-tolerant quantum computer can be desirable in some cases.

In some embodiments, distilling at least one of the pair of entangled qubits into a distillation can include distilling one or more copies of the pair of entangled qubits into one or more approximately pure Bell pairs. As one example, entanglement distillation can be the transformation of N copies of an arbitrary entangled state p into some number of approximately pure Bell pairs. For instance, the entanglement distillation can be performed using only local operations and/or classical communication. Quantum entanglement distillation can mitigate the degenerative influence of noisy quantum channels by transforming previously shared less entangled pairs into a smaller number of maximally entangled pairs.

Additionally, distilling the pair of entangled qubits can include storing, in a memory device, one or more distillation qubits representative of the distillation. For example, the distillation qubits can be associated with a high quality distillation.

Figure 4:
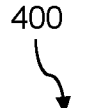
FIG. 4 depicts an example distributed quantum computing system according to example embodiments of the present disclosure.
Figure 4:
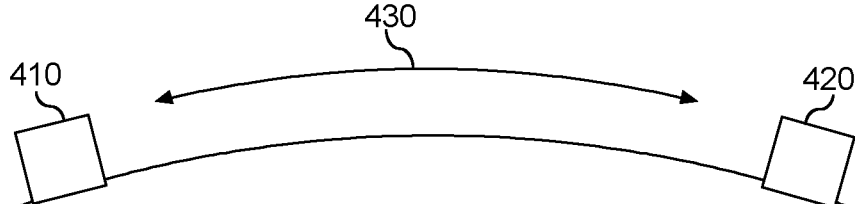

FIG. 4 depicts an example distributed quantum computing system 400 for distributed quantum computing according to example embodiments of the present disclosure. Distributed quantum computing system 400 can include first quantum computing system 410 and second quantum computing system 420. The quantum computing systems 410, 420 can be separated by a distance 430. For instance, the distance 430 can be large such that classical communications (e.g., electrical signal communications, fiberoptic communications, etc.) are undesirably slow at conveying information. For example, distance 430 can span greater than about 1000 kilometers. As another example, distance 430 may span multiple cities, states, provinces, counties, countries, etc. By using quantum entanglement according to example aspects of the present disclosure, coordination between quantum computing systems 410, 420 over distance 430 can be reliably achieved in a desirably fast amount of time.

FIG. 5 depicts a flowchart diagram of an example method 500 for performing distributed computing using a distributed quantum computing system according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, the computer-implemented method 500 can include generating, by an entangled qubit generator, at least a pair of entangled qubits. For example, a distributed quantum computing system can include an entangled qubit generator. the entangled qubit generator can be configured to generate quantum entanglement in a pair of qubits. The entangled qubit generator can be included in a first quantum computing system and/or a second quantum computing system (e.g., at different exchanges) and/or a remote quantum computing system.

At 504, the computer-implemented method can include distributing a first entangled qubit of the pair of entangled qubits to a first quantum computing system and a second entangled qubit of the pair of entangled qubits to a second quantum computing system. The second computing system can be remote from the first quantum computing system. The pair of qubits can be distributed in any suitable manner in accordance with example aspects of the present disclosure. As one example, in some embodiments, distributing the first entangled qubit of the pair of entangled qubits to the first quantum computing system and the second entangled qubit of the pair of entangled qubits to the second computing system can include transmitting at least one of the first entangled qubit or the second entangled qubit through a satellite communication system. For instance, the pair of qubits can be generated at one of the first or second quantum computing systems (and/or a remote quantum computing system) and transmitted to the other(s) by satellite communications. In some embodiments, the satellite communication system can be and/or can include a low-earth-orbit satellite.

As another example, in some embodiments, distributing the first entangled qubit of the pair of entangled qubits to the first quantum computing system and the second entangled qubit of the pair of entangled qubits to the second computing system can include transporting a quantum memory device storing at least one of the first entangled qubit or the second entangled qubit from a first location to a second location. For instance, the quantum memory device (e.g., a delay line) including one of the pair of qubits can be transported by a vehicle, such as a freight train, truck, boat, etc., from a first location to a second location. The second location can be distinct from the first location. In some embodiments, a distance between the first location and the second location can be greater than about 1000 kilometers.

In some embodiments, quantum entanglement swapping can be useful in distributing the qubits. For instance, for a system having three qubits A, B, and C, where qubit A and qubit B are entangled and qubit B and qubit C are entangled, the entanglement between qubits A and B and qubits B and C can be consumed to produce entanglement between qubits A and C.

In some embodiments, after distributing the qubits, the computer-implemented method 500 can include distilling at least one of the pair of entangled qubits into a distillation comprising a high quality entanglement. For instance, high quality entanglement can provide improved performance (e.g., improved speed) of quantum computing operations, such as obtaining quantum measurements (e.g., as opposed to noisy entanglement). For instance, noise can be introduced into the pair of entangled qubits during distribution, which can degrade quality of the entanglement. In some cases, quantum entanglement distillation can require complex quantum processing. Thus, a fault-tolerant quantum computer can be desirable in some cases.

In some embodiments, distilling at least one of the pair of entangled qubits into a distillation can include distilling one or more copies of the pair of entangled qubits into one or more approximately pure Bell pairs. As one example, entanglement distillation can be the transformation of N copies of an arbitrary entangled state p into some number of approximately pure Bell pairs. For instance, the entanglement distillation can be performed using only local operations and/or classical communication. Quantum entanglement distillation can mitigate the degenerative influence of noisy quantum channels by transforming previously shared less entangled pairs into a smaller number of maximally entangled pairs.

Additionally, distilling the pair of entangled qubits can include storing, in a memory device, one or more distillation qubits representative of the distillation. For example, the distillation qubits can be associated with a high quality distillation.

At 506, the computer-implemented method 500 can include obtaining, by a quantum computing system comprising one or more qubits (e.g., the first quantum computing system), a first entangled qubit of a pair of entangled qubits, wherein a second entangled qubit of the pair of entangled qubits is positioned at a second quantum computing system that is remote from the quantum computing system. For instance, the quantum computing system can obtain one of the pair of entangled qubits from the entangled qubit generator.

At 508, the computer-implemented method 500 can include identifying, by the first quantum computing system, a coordinated event trigger. The coordinated event trigger can be indicative of an entanglement condition, such as an entanglement condition associated with a Bell inequality. For instance, one or both of the quantum computing systems (e.g., the first quantum computing system and/or the second quantum computing system) can identify a coordinated event trigger indicative of an entanglement condition. For example, the coordinated event trigger can be indicative that it would be beneficial to perform a distributed control action (e.g., buy or sell financial assets, such as stocks, bonds, etc.). For instance, the quantum computing system(s) can identify (e.g., as a coordinated event trigger) presence of an esoteric game having strict timing constraints that can be indicative of a quantum-advantageous game, such as a CHSH game, Bell games, etc. The games may have time durations of about 10 s of milliseconds, such as less than about 100 milliseconds. For instance, the coordinated event trigger can be identified from exchange data, such as historical and/or current stock data, bond data, currency data, and/or other suitable financial data, and/or any other suitable type of data.

It can be desirable to respond to these quantum-advantageous games in a quick and/or discreet manner. The coordinated event trigger may be present for both quantum computing systems. As one example, a coordinated event trigger can include an event in data, such as a trade. The use of quantum computing, such as quantum entanglement, can be beneficial in responding to the coordinated event trigger, such as providing for quick measurements and/or decision making.

At 510, in response to identifying a coordinated event trigger, the computer-implemented method 500 can include obtaining, by the first quantum computing system and/or the second quantum computing system, quantum measurements of the pair of entangled qubits. For instance, in response to identifying a coordinated event trigger, the first quantum computing system and/or the second quantum computing system can obtain quantum measurements of the pair of entangled qubits. For example, a quantum measurement process can be performed on the pair of entangled qubits at each of the first and/or second quantum computing systems to resolve the pair of entangled qubits to a basis state. In some cases, the quantum measurement process can be performed quickly (e.g., in under a millisecond) such that a timely response to the coordinated event trigger can be determined based on the quantum measurements.

At 512, the computer-implemented method 500 can include performing a distributed control action based at least in part on the quantum measurements. For instance, based on the quantum measurements, the first quantum computing system and/or the second quantum computing system can perform a distributed control action. For instance, the first quantum computing system and second quantum computing system can each perform a coordinated distributed control action. Coordinated distributed control actions can be performed quicker according to example aspects of the present disclosure compared to conventional systems. For instance, tandem distributed control actions can be performed faster using quantum computing systems according to example aspects of the present disclosure than in systems that rely on conventional algorithms, plans, communication, etc. The quantum measurements can be used to improve performance at a "game" (e.g., Bell inequality, such as a Bell game) present in an entanglement condition.

The distributed control action can be and/or can include any suitable action that may be performed at a plurality of computing system and/or any other necessary and/or supplementary computation actions associated therewith. For instance, the distributed control action can be a computer-implemented control action. For example, the distributed control action can include buying and/or selling assets, measuring data, communicating data, etc. For instance, in some embodiments, the quantum computing system can include classical hardware including one or more processors. The distributed control action can include instructing (e.g., by the quantum computing system) the classical hardware to perform a computer-implemented control action. As one example, the distributed control action can include communicating a computer-implemented control action that, when implemented, instructs the classical hardware to perform an asset transaction, such as, for example, buying and/or selling assets.

After the quantum measurements are obtained, the pair of qubits can be resolved (e.g., no longer be in a superimposed state). Thus, to perform further distributed control actions and/or other computations, it may be desirable for the quantum computing systems to obtain new pair(s) of qubits. For instance, new pairs of entangled qubits can be provided intermittently, in response to a quantum measurement, regularly (e.g., after a certain time duration), continuously, as available, and/or according to any other suitable timing. Thus, for example, some or all steps of method 500 can be repeated when more entangled qubits are needed.

Embodiments of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Embodiments of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many embodiments the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, nontransitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single implementation. Conversely, various features that are described in the context of a single implementation can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for performing a distributed control action, the method comprising:

obtaining, by a first quantum computing system comprising one or more qubits, a first entangled qubit of a pair of entangled qubits, wherein a second entangled qubit of the pair of entangled qubits is positioned at a second quantum computing system that is remote from the first quantum computing system;

identifying, by the first quantum computing system, a first coordinated event trigger, the first coordinated event trigger being indicative of an entanglement condition associated with a Bell inequality;

in response to identifying the first coordinated event trigger, obtaining, by the first quantum computing system, first quantum measurements of the first entangled qubit; and performing, by the first quantum computing system, a first distributed control action based at least in part on the first quantum measurements, wherein the first distributed control action is based on a quantum-advantageous strategy correlating the first distributed control action with a second distributed control action to be performed by the second quantum computing system based on second quantum measurements of the second entangled qubit obtained in response to at least one of the first coordinated event trigger and a second coordinated event trigger indicative of the entanglement condition associated with the Bell inequality.

2. The method of claim 1, further comprising distilling the first entangled qubit into a distillation.

3. The method of claim 2, further comprising storing, in one or more memory devices, one or more distillation qubits representative of the distillation.

4. The method of claim 2, wherein distilling the first entangled qubits into the distillation comprises distilling one or more copies of the pair of entangled qubits into one or more Bell pairs.

5. The method of claim 1, further comprising:

generating, by the first quantum computing system, the pair of entangled qubits; and distributing, by the first quantum computing system, the second entangled qubit of the pair of entangled qubits to the second quantum computing system.

6. The method of claim 1, wherein obtaining, by the first quantum computing system, the first entangled qubit of the pair of entangled qubits comprises receiving, by the first quantum computing system, the first entangled qubit from a remote quantum computing system.

7. The method of claim 1, wherein the first entangled qubit is received from a satellite communication system.

8. The method of claim 1, wherein the first entangled qubit is received from a quantum memory device storing at least the first entangled qubit, the quantum memory device transported from a first location to a second location, the second location being distinct from the first location.

9. The method of claim 1, wherein the first distributed control action comprises instructing classical hardware comprising one or more classical processors to perform a computer-implemented control action.

10. The method of claim 9, wherein the first distributed control action comprises communicating a computer-implemented control action that, when implemented, instructs the classical hardware to perform an asset transaction.

11. A quantum computing system configured for distributed computation, the quantum computing system comprising:

quantum hardware comprising one or more qubits; and
one or more memory devices storing instructions, that, when implemented, instruct the quantum computing system to perform operations, the operations comprising:
obtaining, by the quantum hardware, a first entangled qubit of a pair of entangled qubits, wherein a second entangled qubit of the pair of entangled qubits is positioned at a second quantum computing system that is remote from the quantum computing system;
identifying, by the quantum computing system based at least in part on asset exchange data associated with an exchange that is geographically closer to the quantum hardware than to the second entangled qubit, a first coordinated event trigger, the first coordinated event trigger being indicative of an entanglement condition associated with a Bell inequality;
in response to identifying the first coordinated event trigger, obtaining, by the quantum hardware, first quantum measurements of the pair of entangled qubits; and
performing, by the quantum computing system, a first distributed control action based at least in part on the first quantum measurements, wherein the first distributed control action is based on a quantum-advantageous strategy correlating the first distributed control action with a second distributed control action to be performed by the second quantum computing system based on second quantum measurements of the second entangled qubit obtained in response to at least one of the first coordinated event trigger and a second coordinated event trigger indicative of the entanglement condition associated with the Bell inequality.

12. The distributed quantum computing system of claim 11, wherein the operations further comprise distilling, by the quantum computing system, the first entangled qubit into a distillation.

13. The distributed quantum computing system of claim 12, wherein the operations further comprise storing, in the one or more memory devices of the quantum computing system, one or more distillation qubits representative of the distillation.

14. The distributed quantum computing system of claim 12, wherein distilling the first entangled qubit into a distillation comprises distilling one or more copies of the pair of entangled qubits into one or more Bell pairs.

15. The distributed quantum computing system of claim 11, wherein the pair of entangled qubits is generated at the quantum computing system and transmitted to the second quantum computing system.

16. The distributed quantum computing system of claim 11, wherein obtaining, by the quantum hardware, the first entangled qubit of the pair of entangled qubits comprises receiving, by the quantum hardware, the first entangled qubit from a remote quantum computing system.

17. The distributed quantum computing system of claim 11, wherein the first entangled qubit is received from a satellite communication system.

18. The distributed quantum computing system of claim 11, wherein the first entangled qubit is received from a quantum memory device storing at least the first entangled qubit, the quantum memory device transported from a first location to a second location, the second location being distinct from the first location.

19. The distributed quantum computing system of claim 11, wherein the quantum computing system further comprises classical hardware comprising one or more processors, and wherein the first distributed control action comprises instructing the classical hardware to perform a computer-implemented control action.

20. The distributed quantum computing system of claim 19, wherein the first distributed control action comprises communicating the computer-implemented control action that, when implemented, instructs the classical hardware to perform an asset transaction.

\* \* \* \* \*